(12) United States Patent  
Takata

(10) Patent No.: US 6,860,561 B2  
(45) Date of Patent: Mar. 1, 2005

(54) FOLDING SEAT

(75) Inventor: Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/899,477

(22) Filed: Jul. 5, 2001

(65) Prior Publication Data

US 2002/0041121 A1 Apr. 11, 2002

(30) Foreign Application Priority Data

Jul. 10, 2000 (JP) ........................................ 2000-208780

(51) Int. Cl.[7] .............................................. B60N 2/36
(52) U.S. Cl. .............................. 297/378.1; 297/378.12; 297/452.56; 297/440.11; 297/378.14
(58) Field of Search ........................... 297/378.1, 16.1, 297/16.2, 452.56, 378.12, 378.14, 440.11

(56) References Cited

U.S. PATENT DOCUMENTS

| | | | | |
|---|---|---|---|---|
| 2,237,188 A | * | 4/1941 | McClelland | 297/378.1 |
| 3,034,829 A | * | 5/1962 | Flint | 297/378.1 |
| 4,877,282 A | | 10/1989 | Yamauchi | 296/65.1 |
| 4,914,836 A | * | 4/1990 | Horovitz | 36/28 |
| 5,139,308 A | * | 8/1992 | Ziman | 297/16.1 X |
| 5,941,602 A | * | 8/1999 | Sturt et al. | 297/378.1 X |
| 6,302,487 B1 | * | 10/2001 | Fujita et al. | 297/452.56 |
| 6,315,364 B1 | * | 11/2001 | Fujita et al. | 297/452.56 |
| 6,336,679 B1 | * | 1/2002 | Smuk | 297/378.1 X |
| 6,371,558 B1 | * | 4/2002 | Couasnon | 297/378.1 |
| 6,435,618 B1 | * | 8/2002 | Kawasaki | 297/452.56 |
| 6,485,103 B1 | * | 11/2002 | Yamada et al. | 297/452.56 |
| 2001/0052722 A1 | * | 12/2001 | Amorin et al. | 297/378.1 |

FOREIGN PATENT DOCUMENTS

| | | |
|---|---|---|
| DE | 2107435 | 9/1971 |
| DE | 3102845 | 8/1982 |
| WO | 9941103 | 8/1999 |

* cited by examiner

*Primary Examiner*—Rodney B. White  
(74) *Attorney, Agent, or Firm*—Steinberg & Raskin, P.C.

(57) ABSTRACT

A folding seat comprising a seat cushion having a cushioning member supported by a seat frame and a seat back having a cushioning member supported by a back frame which is pivoted forward with respect to the seat frame so that a seat comprised of the seat cushion and the seat back can be folded. The distance between each of the side frames composing the seat frame is arranged to be wider than the distance between each of the side frames composing the back frame. A front end frame of the seat frame is positioned outside an upper end frame of the back frame when the seat frame and the back frame come close together upon folding the seat. Accordingly the thickness of the whole seat can be substantially the same as the seat cushion or the seat back alone, when the seat is folded. Thus, luggage space for baggage in a vehicle can be increased when the seat is folded.

4 Claims, 7 Drawing Sheets

FOLDING SEAT

BACKGROUND OF THE INVENTION

The present invention relates to a folding seat used for, for instance, a seat of a car.

A folding seat which can be folded by pivoting a seat back forward to get close to a seat cushion has been known. Folding a seat in this way is popular to make a baggage space wide, when a number of baggage have to be loaded into the car.

However, when a conventional folding seat is folded, the seat back is simply placed on the seat cushion. Therefore, even folded, a space for layers of the seat cushion and the seat back occupies a portion of the baggage space. A generally used folding seat for a vehicle is such that polyurethane foam as a cushioning member is supported by a frame and the whole is covered with a covering member. Even rather thin seat cushion and seat back still have a thickness of about 70 mm respectively. Accordingly, when they are folded into layers, the folded seat is about 140 mm thick.

SUMMARY OF THE INVENTION

The present invention is carried out in view of the above-described circumstances, and its object is to provide a folding seat which enables a total thickness of a seat cushion and a seat back to be thinner than the thickness of a conventional folding seat upon folding, each other so that the bagage space can be widened.

In accordance wit one aspect of the present invention, a folding seat is provided to solve the above-described problem. The folding seat comprises: a seat cushion having a cushioning member supported by a seat frame; and a seat back having, a cushioning member supported by a back frame which is pivoted forward with respect to the seat frame so that a seat comprised of the seat cushion and the seat back can be folded, wherein a distance between inner sides of side frames composing the seat frame is arraigned to be wider than a distance between outer side of side frames composing the back frame, and the front end frame of the seat frame is positioned outside of the upper end frame of the back frame when the seat frame and the back frame come close upon folding the seat; and wherein the back frame is surrounded by each of the side frames and the front end frame of the seat frame when the seat is folded so that the seat can be folded in a condition that the back frame is positioned inside these frames composing the seat frame.

A preferred embodiment of the present invention provides a folding seat comprising: a base plate having side plates disposed facing to each other at a predetermined space, each having a long hole formed in a substantially arc shape; a pair of brackets protruding at a predetermined space with each other near the rear end on the upper face of the base plate; connection plates of which each one end is pivotably connected to each of the brackets; a back frame comprised of an upper end frame and a pair of side frames extending from both ends of the upper frame to support a cushioning member, and each lower end of the side frames is connected to the other end of the connection plate; linkage plates sandwitching each side frame of the back frame, disposed in the opposite side with respect to each connection plate, and linked to each side frame; a shaft inserting through into a lower end of each linkage plate, and provided to be capable of linking with each substantially arc-shaped long holes of the base plate; a seat frame comprising a front end frame to support the cushioning member, long holes extending longitudinally from both ends of the front end frame toward the vicinity of the rear end, and a pair of side frames having a through-hole between the long hole and the rear end; a shaft member inserting into the through-hole formed on each side frame of the seat frame, and fixed in such a manner that the connection plates are installed pivotable with respect to each side frame; and guide shafts inserting into the through-hole formed on each side frame of the seat frame, and linked to a halfway portion of the linkage plate, wherein a distance between inner sides of side frames forming the seat frame is arranged to be wider than a distance between outer sides of side frames forming the back frame, and the front end frame of the seat frame is positioned outside of the upper end frame of the back frame while the seat frame and the back frame come close upon folding the seat; and wherein said guide shaft positions in front in each long hole formed on said seat frame, and said shaft positions in front in each substantially arc-shaped long hole formed on said base plate when the seat is in use, and when the seat is folded, the back frame can be folded to be surrounded by the seat frame in such a manner that each connection plate pivots together with the back frame around the bracket, the shaft moves backward in each substantially arc-shaped long hole, and the guide shaft also moves backward in each long hole.

In a preferred embodiment of the present invention, the cushioning member supported by the seat frame is capable of changing its shape as if it sunk when pressed by the back frame upon being folded.

In a preferred embodiment of the present invention, the cushioning member supported by the seat frame is made of a net member in a three-dimensional structure in which a front mesh layer and a back mesh layer are connected with a large number of piles.

In a preferred embodiment of the present invention, the cushioning members supported by the seat frame and the cushioning member supported by the back frame are made of a net member in a three-dimensional structure in which a front mesh layer and a back mesh layer are connected with a large number of piles, and have one-piece structure united integrally with two cushioning members.

DETAILED DESCRIPTION OF THE PREFERRED EMBODIMENTS

Figure 1:
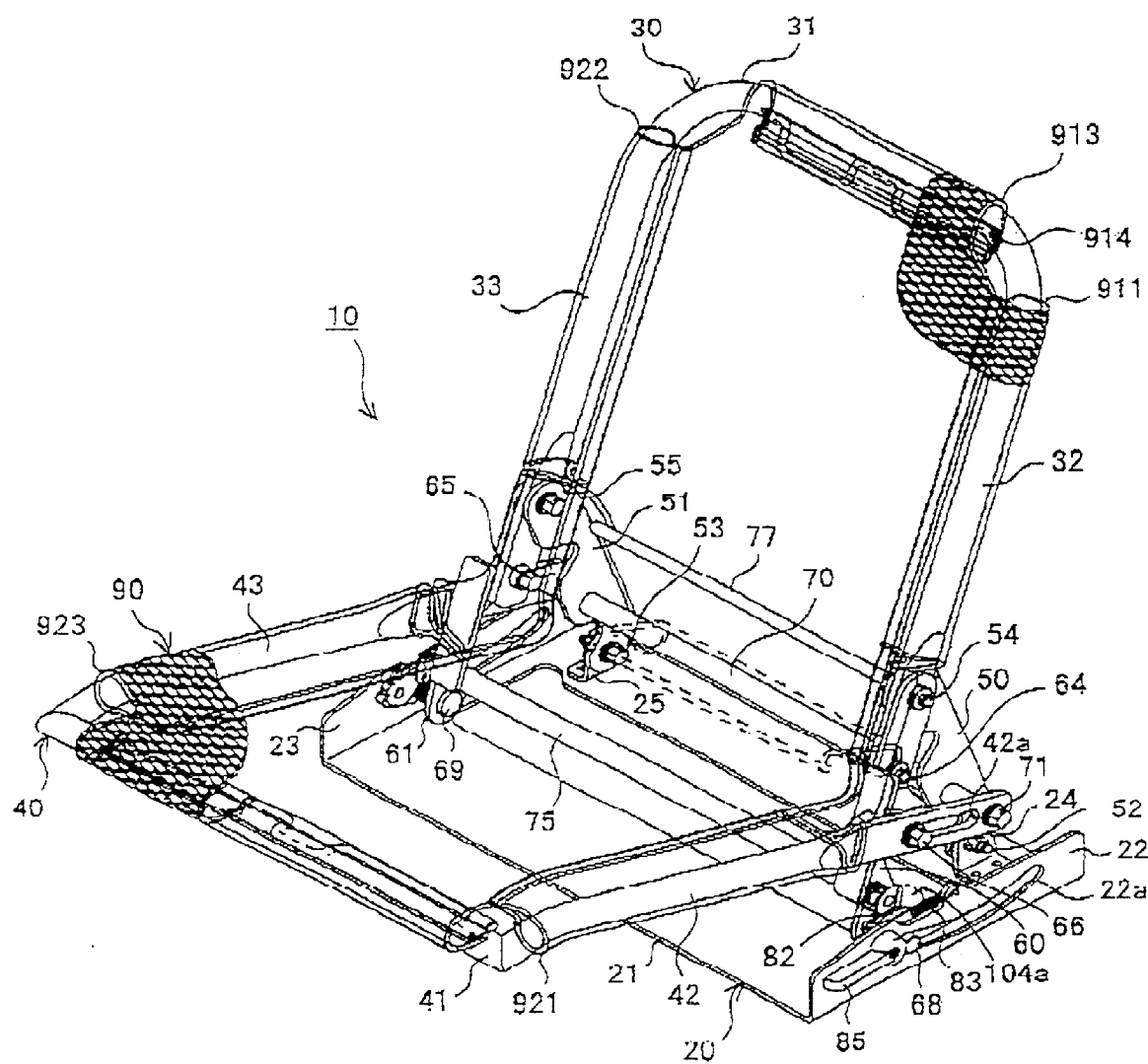
FIG. 1 is a perspective view showing the state of a folding seat relating to an embodiment of the present invention when it is in use.
Figure 2:
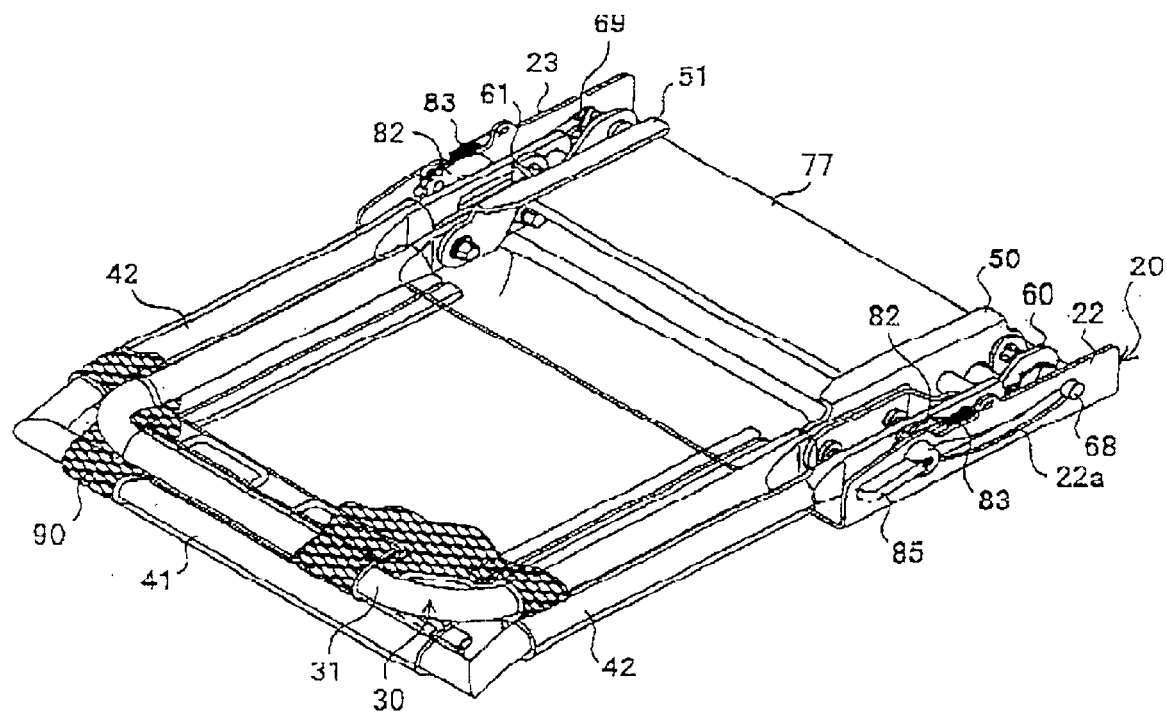
FIG. 2 is a perspective view showing the state of the folding seat relating to the above embodiment when it is folded.
Figure 3:
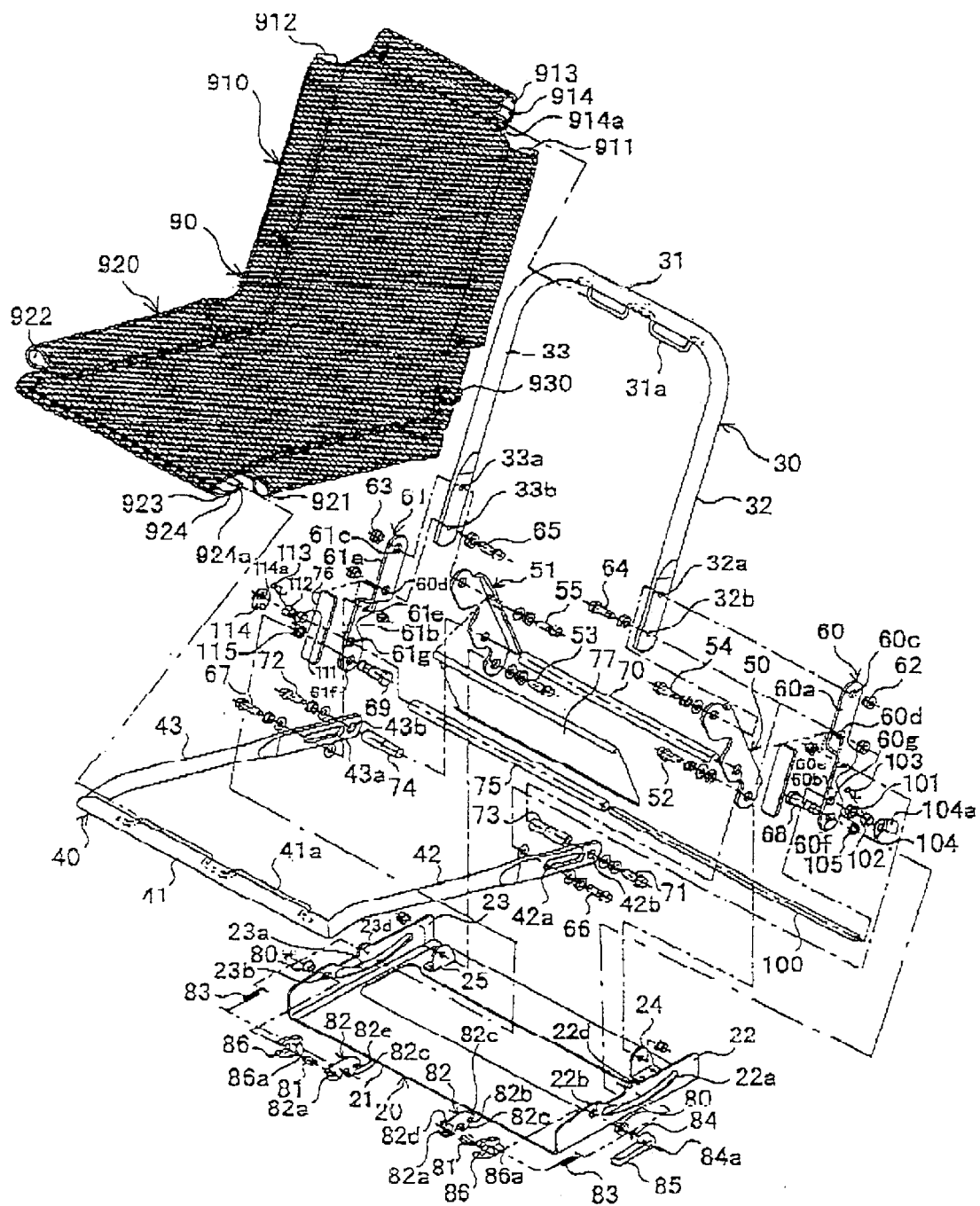
FIG. 3 is an exploded perspective view of the folding seat relating to the above embodiment.

The present invention will be explained in more detail according to embodiments shown in the drawings. FIG. 1 is a perspective view showing the state of using a folding seat 10 relating to the present embodiment, and FIG. 2 is a perspective view showing a state when it is being folded. FIG. 3 is an exploded perspective view of the folding seat. As shown in FIG. 1 to FIG. 3, the folding seat 10 of this embodiment comprises a base plate 20, a back frame 30, a seat frame 40 and a net member 90 as a cushioning member.

The base plate 20 comprises a base 21 having a width wider than the width of the seat frame 40, and side plates 22 and 23 disposed facing each other at a predetermined space between both side plates by bending upward from side edges of the base 21. The base 21 is fixed or supported to be slidable back and forth on a car floor, if it is used, for instance, in a car. A pair of brackets 24 and 25 protrude at a predetermined space between both brackets, near the rear end on the upper face of the base 21. Long holes 22a and 23a each having substantially an arc shape when seen from a side (hereinafter, arc-shaped long hole) are bored in the side plates 22 and 23.

The back frame 30 is formed substantially in the shape of the letter U, and has an upper end frame 31 and a pair of side frames 32 and 33 extending from both ends of the upper end frame 31, and facing each other. Four through-holes 32a, 32b, 33a, and 33b, two through-holes each are bored at a predetermined space in the longitudinal direction of each of the side frames 32 and 33 near lower ends of the side frames 32 and 33 (ends on the lower side when the seat is used).

The seat frame 40 is formed substantially in the shape of the letter U similar to the back frame 30, and has a front end frame 41 and a pair of side frames 42 and 43 extending from both ends of the front end frame 41, and facing each other. Long holes 42a and 43a each having a predetermined length are bored near the rear ends of the side frames 42 and 43 (ends on the seat cushion side when in use). Through-holes 42b and 43b are bored between the long holes 42a, and 43a and the rear ends of the side frames 42 and 43 respectively. The space between the side frames 42 and 43 composing the seat frame 40 is made wider than the space between the side frames 32 and 33 composing the back frame 30.

Respective lower ends of connection plates 50 and 51 are pivotably fixed to the respective brackets 24 and 25 provided on the base plate 20 with shaft members 52 and 53. The upper ends of the connection plates 50 and 51 are pivotably fixed into the upper side through-holes 32a and 33a formed in respective side frames 32 and 33 of the back frame 30 with the shaft members 54 and 55.

The shaft members 54 and 55 are inserted through the through-holes 32a and 33a from inside in a state that the connection plates 50 and 51 are positioned in the inside of respective side frames 32 and 33 of the back frame 30 as shown in FIG. 3. Linkage plates 60 and 61 are disposed on the opposite side of respective side frames 32 and 33, and the shaft members 54 and 55 are connected to bushes 62 and 63 through the through-holes 60c and 61c formed at the highest portion of the linkage plates 60 and 61.

The linkage plates 60 and 61 are made of a plate member processed into the shape of the letter Z when seen from the side end face, which are composed of first flat portions 60a and 61a which are from the upper end to a halfway portion, and second flat portions 60b and 61b obtained by bending outward at a nearly right angle from the halfway portion and then further bending downward at a nearly right angle.

In the first flat portions 60a and 61a, respective two through-holes 60c and 60d, and 61c and 61d are provided, and the shaft members 54 and 55 are inserted into the upper through-holes 60c and 61c as described above. Screws 64 and 65 to connect the linkage plates 60 and 61 with respective side frames 32 and 33 of the back frame 30 are screwed into the lower through-holes 60d and 61d.

The second flat portions 60b and 61b are provided with respective three through-holes 60e, 60f, and 60g, and 61e, 61f and 61g at certain intervals along the vertical direction, and the second flat portions 60b and 61b are disposed to locate in the inside of respective side frames 42 and 43 of the seat frame 40. The upper through-holes 60e and 61e are placed along the long holes 42a and 43a formed in the side frames 42 and 43 of the seat frame 40, and the guide shafts 66 and 67 are inserted between the through-holes 60e, 61e and the long holes 42a, 43a. Note that the guide shafts 66 and 67 have a diameter in a condition that the guide shafts 66 and 67 can move along the long holes 42a and 43a.

The second flat plates 60b and 61b are placed so that the lower through-holes 60f and 61f formed below the second flat plates are located along the inside of the arc-shaped long holes 22a and 23a formed in the base plate 20. Shafts 68 and 69 having a diameter in a condition that the shafts can move along the arc-shaped long holes 22a and 23a, are inserted between the through-holes 60f, and 61f, and the arc-shaped long holes 22a and 23a.

As a result of being assembled in this way, as shown in FIG. 1, when it is in use, the guide shafts 66 and 67 are placed in front of the long holes 42a and 43a, and the shafts 68 and 69 are also placed in front of the arc-shaped long holes 22a and 23a, and thereby the second flat portions 60b and 61b are pushed forwarder in a slant direction than the first flat portions 60a and 61a in the linkage plates 60 and 61. As a result, the back frame 30 is supported by the linkage plates 60, 61 and the connection plates 50, 51 in an inverted shape of the letter V when seen from the side so that the back frame 30 and the seat frame 40 can be securely and stably supported in a wide opened position when in use.

Furthermore, the connecting position of the connection plates 50 and 51 or the linkage plates 60 and 61 with respect to the back frame 30, the position and size of the arc-shaped long holes 22a and 23a formed in the side plates 22 and 23 of the base plate 20, and the position and size of the long holes 42a and 43a formed in the side frames 42 and 43 of the seat frame 40 are determined in such a manner that the position of the upper end frame 31 of the back frame 30 is located to be inside of the front end frame 41 of the seat fame 40 when the back plate 30 is pivoted to come close to the seat plate 40 to be folded (see FIG. 2). As above, since the back frame 30 and the seat frame 40 are formed in such a manner that the distance between the inner sides of the side frames 42 and 43 of the seat frame 40 is wider than the distance between the outer sides of the side frames 32 and 33 of the back frame 30, the back plate 30 can be folded in a state that the back plate 30 is surrounded by the seat frame 40 by setting the positional relation between the front end frame 41 and the upper end frame 31 to be as described above.

Here, the numeral 70 indicates a frame located around the back of the waist of a person sitting on the seat, that is, a waist frame disposed almost horizontally between the connection plates 50 and 51 facing each other. More concretely, as shown in FIG. 3, the waist frame 70 is supported by being inserted into protruding portions of bushes 73 and 74 toward the inside of the connection plates 50 and 51, wherein the bushes 73 and 74 are inserted into through-holes formed near the center of the connection plates 50 and 51, and the connection plates 50 and 51 are pivotable with respect to the bushes 73 and 74. Protruding portions of the bushes 73 and 74 which protrude outward through the connection plates 50 and 51 are disposed to fit to shaft members 71 and 72 which are inserted into the through-holes 42b and 43b formed near the rear end of the side frames 42 and 43 of the seat frame 40.

The numeral 75 indicates a seat rear frame disposed almost horizontally between the second flat portions 60b and 61b of the linkage plates 60 and 61. The numeral 76 is a reinforcing plate to be fixed to each front end face by welding after the linkage plates 60 and 61 are put together with the side frames 32 and 33, and the numeral 77 is an auxiliary plate being laid between rear end faces of the connection plates 50 and 51 to help in supporting the load on the back frame 30 and the connection plates 50 and 51, when in use.

Figure 4:
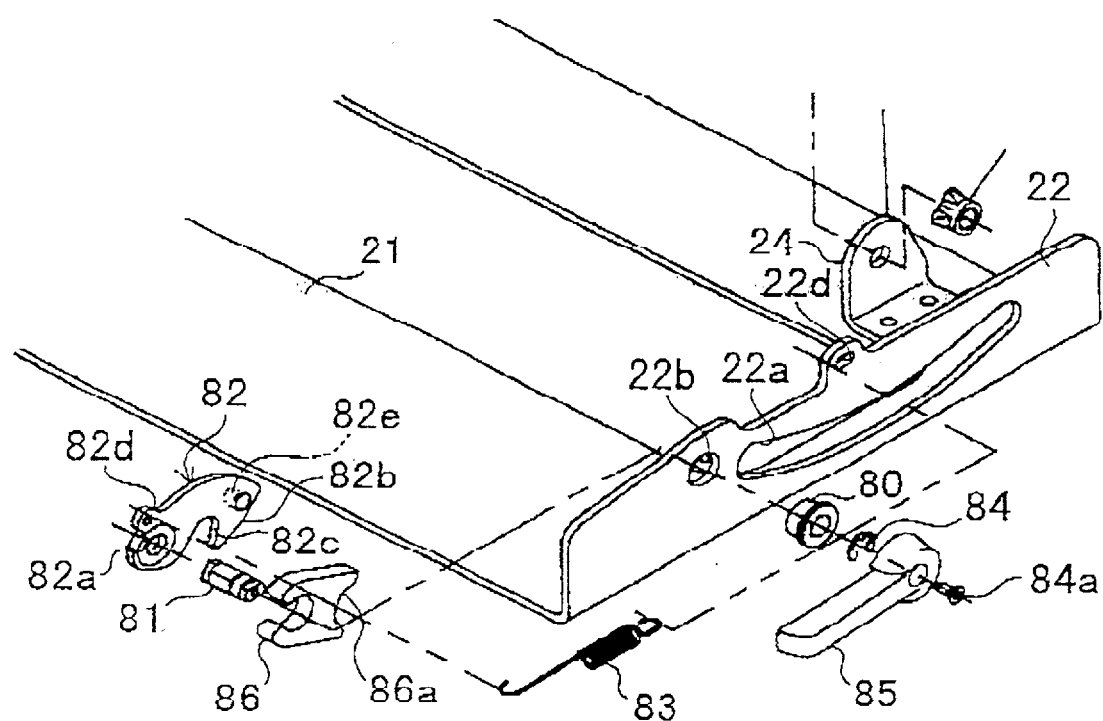
FIG. 4 is an enlarged view to explain a locking mechanism.

Next, a locking mechanism to keep the back plate 30 and the seat plate 40 in a wide opened state when the seat is in use will be explained with FIG. 3 and FIG. 4. The locking mechanism comprises: locking shafts 81 and 81 to be inserted into locking bushes 80 and 80 which fit to holes 22b and 23b formed in front of the arc-shaped long holes 22a and 23a in the respective side plates 22 and 23 of the base plate 20; and locking plates 82 and 82 of which base ends 82a and 82a are connected to protruding portions of the locking shafts 81 and 81 protruding toward the inside of the side plates 22 and 23. The locking plates 82 and 82 have front ends 82b and 82b of which end faces are curved, and have cut-out portions 82c and 82c with a predetermined width which are cut out from the lower ends in the upward slanting direction. The position of the shafts 68 and 69 can be locked by engaging respective shafts 68 and 69 which are inserted into the arc-shaped long holes 22a and 23a of the respective side plates 22 and 23, to the cut-out portions 82c and 82c.

In more detail, in a normal condition, the locking plates 82 and 82 are downwardly forced around the front ends 82a and 82a, and when the shafts 68 and 69 touch the end faces of the curved front ends 82b and 82b, the shafts 68 and 69 push up the front ends 82b and 82b so that the shafts are housed inside the cut-out portions 82c and 82c. Though the method to force the locking plates 82 and 82 downward is optional, in the present embodiment, coil springs 83 and 83 are used, which are arranged to engage one ends of the coil springs with engaging holes 82d and 82d formed on the upper portions near the base ends of the locking plates 82 and 82, and to engage the other ends with the engaging holes 22d and 23d formed on the upper portions of the arc-shaped long holes 22a and 23a of the side plates 22 and 23 of the base plate 20. Since the one ends of the coil springs 83 and 83 are engaged with the engaging holes 82d and 82d formed on the upper portions near the base ends of the locking plate 82 and 82, the front ends 82b and 82b are forced downward around the base ends 82a and 82a.

The locking mechanism has a lock release lever 85 which connects with a locking shaft 81 protruding toward the outside of the side plate 22 through the locking bush 80 disposed on one of the side plates 22 side, and an e-ring is disposed between the locking bush 80 and the lock release lever 85 which is connected to the locking shaft 81 with a screw 84a. At a normal position where the lock release lever 85 is forced by elastic force of the coil spring 83, as shown in FIG. 1, the lock release lever 85 is designed to be placed along the longitudinal direction of one of the side plates 22 of the base plate 20. When the front end of the lock release lever 85 is pulled down, one of the locking plates 82 pivots in a direction to break away the shaft 68 from the cut-out portion 82c through the locking shaft 81 so that the lock can be released.

At this time, a protrusion 82e provided on the front end of the locking plate 82 pushes up a protruding piece 104a of a set plate 104 which is always forced to pivot downward in FIG. 3 by a spring member 105 supported by the shaft 68, against the elastic force of the spring member 105. The set plate 104 is connected to a boss 102. The boss 102 is connected to a bush 101 attached to the through-hole 60g placed in the center of three through-holes formed in the second flat portion 60b of the linkage plate 60. A connection shaft 100 rotatably inserted into a seat rear frame 75 is attached to the bush 101 and the boss 102, and the bush 101 is connected to the connection shaft 100 through a snap pin 103. Accordingly when the set plate 104 is pushed up as above to pivot in the left direction in FIG. 3, the connection shaft 100 pivots in the same direction, accompanied by the rotational movement.

On the other hand, a bush 111 is attached to the through-hole 61g which locates in the center among three through-holes formed in the second flat portion 61b of the other linkage plate 61, and a boss 112 and a set plate 114 are further connected to the bush 111. The other end of the connection shaft 100 is inserted into the bush 111 and the boss 112 and is connected through a snap pin 113. A spring member 115 is attached to the shaft 69 inserted into the through-hole 61f formed in the lower end of the second flat portion 61b of the other linkage plate 61, and this spring member 115 is linked to the set plate 114 and is forced downward in FIG. 3. The set plate 114 is provided with a protruding piece 114a which is able to abut on a protrusion 82e of the locking plate 82 disposed on the other side plate 23 side.

Accordingly, when the connection shaft 100 pivots as above, the set plate 114 disposed on the other linkage plate 61 side pivots in the same direction against the elastic force of the spring member 115, and its protruding piece 114a abuts on the protrusion 82e of the locking plate 82 disposed on other side plate 23 side to allow the locking plate 82 to pivot upward around the base end 82a, that is, to pivot in a direction to detach the shaft 69 away from the cut-out portion 82c. Thus, the lock on the other side plate 23 side can be released in synchronization with the release of lock on the one of the side plates 22 side.

Stopper plates 86 and 86 which lie between the side plates 22, 23 and the locking plates 82, 82 in the inside of the side plates 22 and 23, are connected to the locking bushes 80 and 80 attached to holes 22b and 23b of respective side plates 22 and 23. Front end faces 86a and 86a of the stopper plates 86 and 86 are cut-out to form substantially arc-shaped recesses, and when the shaft 68 and 69 reach the front ends of the arc-shaped long holes 22a and 23a, the front end faces 86a and 86a abut on the shafts 68 and 69 to prevent the shafts 68 and 69 from falling down forward.

Next, the cushioning member in the present embodiment supported by the above-described back frame 30 and the seat frame 40 will be explained here. The cushioning member of the present embodiment is composed of a net member in a three-dimensional structure in which a front mesh layer and a back mesh layer are bonded with a large number of piles. The net member 90 in the three-dimensional structure has a truss structure (a three-dimensional structure) in which a front mesh layer and a back mesh layer are connected with a large number of piles. This net member has an elastic structure with resistance to settling, is excellent in air permeability, in pressure dispersion characteristic caused by body weight, and in impact absorption characteristic, and can show a high cushioning ability even it is of a thin type.

As described above, the present invention is characterized in that the total thickness in a folded state can be thinner than ever, since the back frame 30 is surrounded by the seat frame 40 in the folded state. Therefore, it becomes necessary for the cushioning member supported by the seat frame 40 to be pressed by the back frame 30 to be depressed so that the back frame 30 is placed in the inside of the seat frame 40 when the seat is folded. For this purpose, it is preferable to compose a cushioning member from a net member having a three-dimensional structure which has a sufficient impact absorption characteristic, etc. even it is of a thin type, can be set by hanging around its edge onto the side frames 42 and 43, and is possible to be depressed in such a manner that the edge of the net member slides turning inward around the side frames 42 and 43 when the net member is pressed by the back frame 30.

As above, a cushioning member supported by the seat frame 40 is preferably a net member having such a three-dimensional structure, but a cushioning member supported by the back frame 30 is not particularly limited to the net member having a three-dimensioned structure. However, in a sense to make the thickness of the whole seat cushion including a cushioning member and the back frame 30 thin, it is also preferable to compose the cushioning member supported by the back frame 30 from a net member having a three-dimensional structure.

Respective cushioning members supported by the back frame 30 and the seat frame 40 can be set separately, but it is preferable to use a net member 90 which has a one-piece structure united integrally with two cushioning members as in the present embodiment.

By adopting the net member 90 having such a one-piece structure as in the present embodiment, the central portion having the best cushioning property is located under a portion from the haunches to the waist where receives the largest load when being seated. Accordingly, the cushioning property of the net member 90 is effectively exhibited, the hard touch feeling caused by the waist frame 70 and the seat rear frame 75 which are disposed on the border of the seat back and the seat cushion is reduced and the feeling of seating can be improved. It is needless to say that a backing cloth (not shown) can be provided, if necessary.

Figure 5:
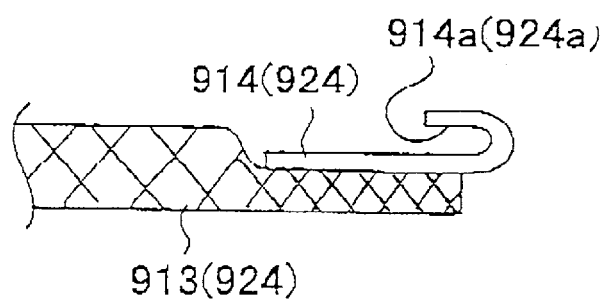
FIG. 5 is a view to explain an engaging plate.

More concretely, as shown in FIG. 3, the net member 90 is formed to constitute a back cushion 910 supported by the back frame 30 and a seat cushion 920 supported by the seat frame 40, bring bounded by around the center. The back cushion 910 is comprised of side edges 911, 912 which are sewed together to be substantially a cylindrical shape, and an upper edge 913 formed to protrude upward. As shown in FIG. 5, an engaging plate 914, made of plastic and provided with an engaging portion 914a which is folded back toward the opposite side at the front end, is fixed tightly on the back face of the upper edge 913 by means of vibration welding, etc. The respective side frames 32 and 33 of the back frame 30 are inserted into the nearly cylindrical side edges 911 and 912, the upper edge 913 is pulled round backward from the upper end frame 31 of the back frame 30, and an engaging wire 31a protrudedly fixed downward on the upper end frame 31 is engaged with the engaging portion 914a of the engaging plate 914.

A seat cushion 920 includes side edges 921 and 922 which are sewed together to he substantially a cylindrical shapes and a front edge 923 formed to protrude forward. As shown in FIG. 5, an engaging plate 924 provided with an engaging portion 924a similar to the above-described back cushion 910 is fixed tightly on the back face of the front edge 923. The respective side frames 42 and 43 of the seat frame 40 are inserted into nearly cylindrical side edges 921 and 922, the front edge 923 is pulled round from the front side of the front end frame 41 of the seat frame 40 to the back side, and the engaging portion 924a of the engaging plate 924 of the front edge 923 is engaged with an engaging wire 41a provided on the front end frame 41 of the seat frame 10.

Thus, the net member 90 in a one-piece structure is supported by the back frame 30 and the seat frame 40 to serve as a cushioning member. It should be noted that the nearly cylindrical side edges 921 and 922 of the seat cushion 920, which are disposed at least around respective side frames 42 and 43 of the seat frame 40, are formed to have their inside diameters a little larger than the diameter of the side frames 42 and 43 with a clearance in order that the cushioning member can be depressed in such a manner that the side edges 921 and 922 slide inward around the side frames 42 and 43 when pressed by the back frame 30.

The numeral 930 indicates a straining member provided near a lower portion of the back face of the back cushion 910. As shown with a broken line in FIG. 1, the straining member 930 is fixed on the back cushion 910 to protrude backward with a smaller width than the space between respective side frames 32 and 33 of the back frame 30, and is wound around the waist frame 70. With this straining member 930, the back cushion 910 is securely strained. The straining member 930 is acceptable so far as it has such a function. Accordingly, it can be composed of a net member having a three-dimensional structure similar to the back cushion 910, or it can be composed of cloth, or a plastic sheet, etc.

Figure 6:
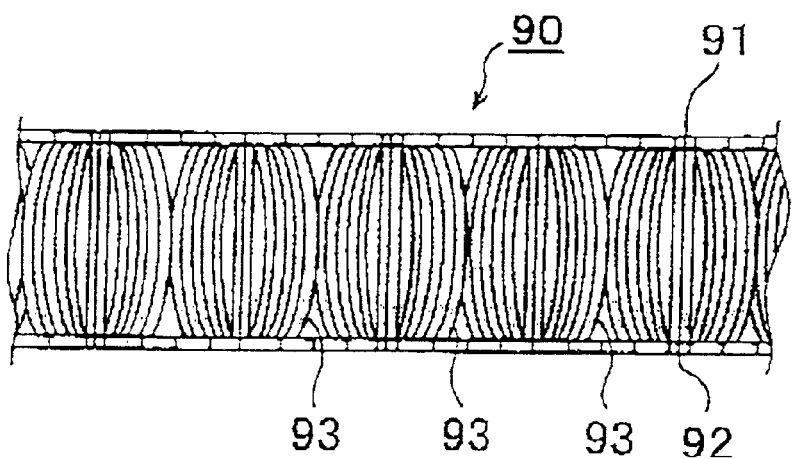
FIG. 6 is a sectional view showing a portion of a net member in a three-dimensional structure, which is used in the above embodiment.

The net member 90 in a three-dimensional structure has formation as follows. As shown in FIG. 6, the net member 90 is formed of a stereoscopic truss structure (a three-dimensional structure) including the front mesh layer 91, the back mesh layer 92, and a number of piles 93 which connects the front mesh layer 91 and the back mesh layer 92.

Figure 7:
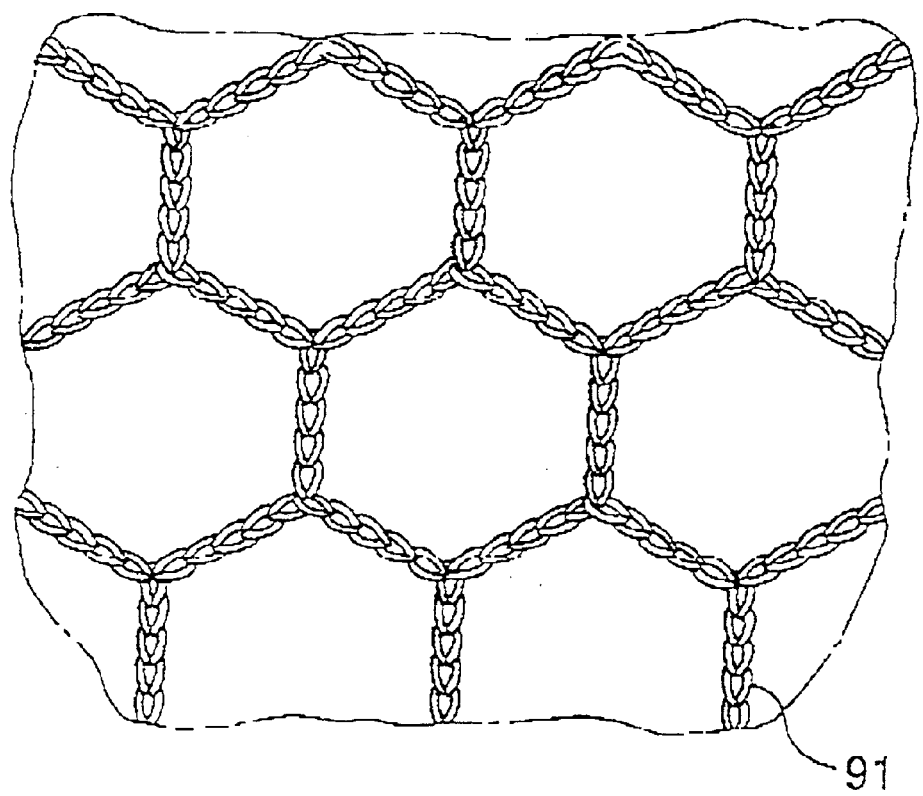
FIG. 7 is an enlarged view showing a front mesh layer of the net member shown in FIG. 6.
Figure 8:
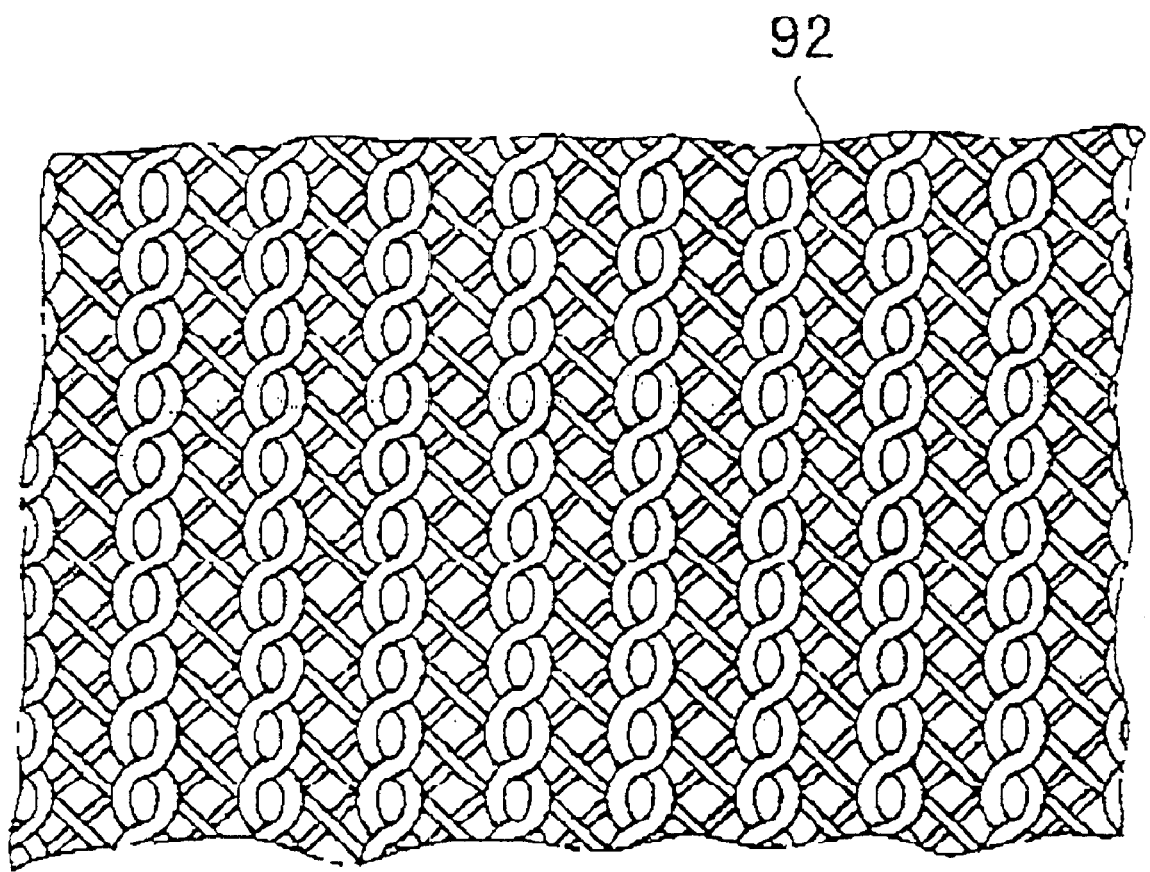
FIG. 8 is an enlarged view showing a back mesh layer of the net member shown in FIG. 6.

The front mesh layer 91 is formed into a structure having, for instance, a honeycombed (hexagonal) mesh made from multifilaments stranded of monofilaments, as shown in FIG. 7. The back mesh layer 92 is formed, for instance, by rib knitting of multifilaments stranded from monofilaments, as shown in FIG. 8, into a structure having a smaller mesh (fine mesh) than the honeycombed mesh of the front mesh layer 91. The pile 93 is formed of monofilaments or multifilaments which are knitted connecting between the front mesh layer 91 and the back mesh layer 92 so that the front mesh layer 91 and the back mesh layer 92 maintain a predetermined space from each other, thereby giving a predetermined stiffness to the net member 90 which is now a stereoscopic mesh knit. Incidentally, when the word "fiber" is simply used in this description, it means to include spun yarn as well as a monofilament and a multifilament.

In addition, though in the above explanation, a layer having a honeycombed mesh is defined as the front face (for instance, a surface of the seat cushion and seat back being in contact with the human body), it is acceptable to define the above as the back face, and a layer having fine mesh as the front face. It is also acceptable to adopt a mesh shape other than a honeycombed shape or a fine mesh shape as a structure of the mesh layer, as shown in table 1 to be described later.

As a material to compose the front mesh layer 91, the back mesh layer 92 or the pile 93, a thermoplastic resin is preferable. The following resins can be used, for instance, thermoplastic polyester resin such as polyethylene tereplithalate (PET) and polybutylene terephthatate (PBT), polyamide resin such as nylon 6 and nylon 66, polyolefin resin such as polyethylene and polypropylene, or a mixed resin containing more than two kinds of these resins.

The thickness of a fiber composing the pile 93 should be, for instances more than 380 d, preferably 600 d or more. Then, the load generated by a person who sits on the seat can be supported through deformation of the mesh composing respective mesh layers 91 and 92, and falling of the pile 93, so that the seat can be of a soft structure without concentration of stress.

Figure 9A:
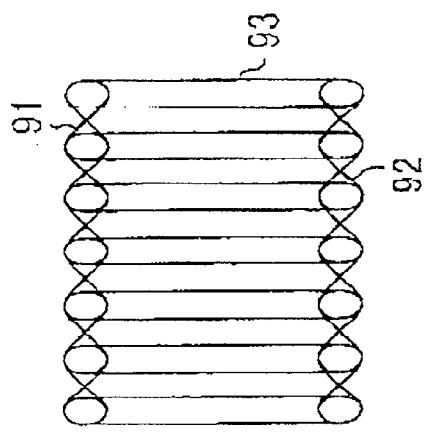
FIG. 9A to FIG. 9E are views to explain the way of arranging piles.
Figure 9B:
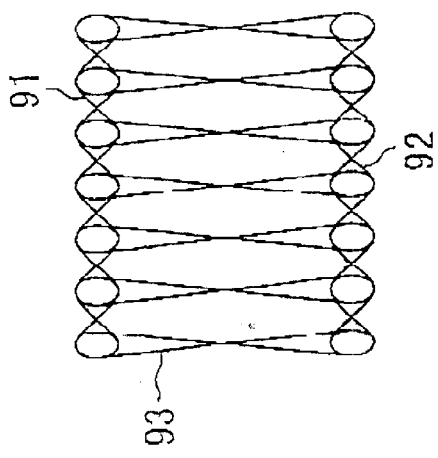
Figure 9E:
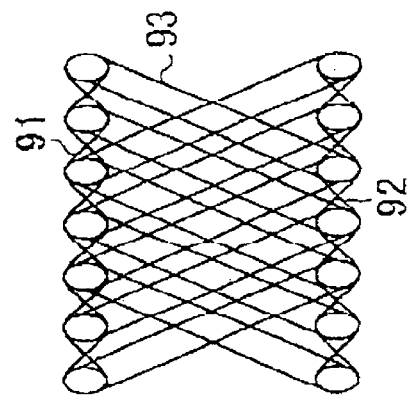
Figure 9D:
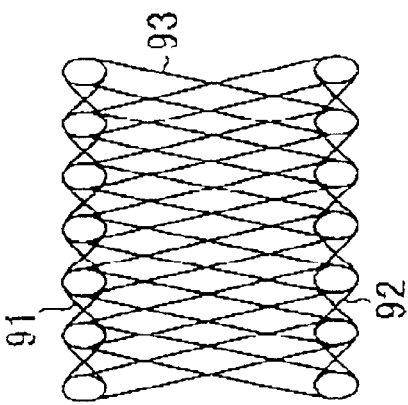
Figure 9C:
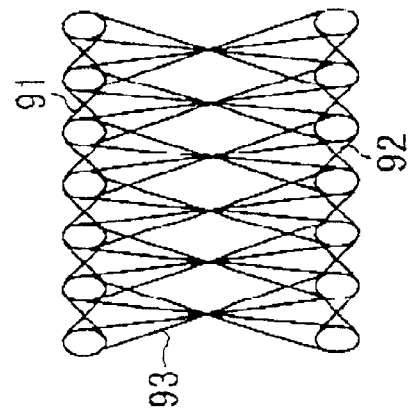

Several characteristics of the examples usable as the net member 90 in a three-dimensional structure relating to the present embodiment will be shown in Table 1.

mesh layer 92 in such a manner that the piles 93 cross each other at the halfway. Among them, FIG. 9C shows a type in which the piles 93 cross in the shape of the letter "8", FIG. 9D shows another cross type in which the pile 93 are knitted in a simple cross, and FIG. 9E shows still another cross type in which the piles 93 are crossed each other bringing two pieces together (double cross).

When the folding seat 10 of the present embodiment is folded from the state shown in FIG. 1 in which the seat is in use to the state shown in FIG. 2, both of the locking plate 82 and 82 are pivoted through the connection shaft 100 against the coil springs 83 and 83 by pushing down the front end side of the lock release lever 85 to release the engagement

TABLE 1

| NUMBER | | 1 | 2 | 3 | 4 | 5 | 6 |
|---|---|---|---|---|---|---|---|
| MATERIAL | | NYLON | POLYESTER | ← | ← | ← | ← |
| WEIGHT (g/m²) | | 888 | 784 | 864 | 984 | 876 | 1128 |
| DENSITY | LONGITUDINAL (PIECE/inch) | 8.0 | 7.5 | ← | 8.5 | 7.0 | 8.5 |
| | LATERAL (PIECE/inch) | 14.0 | 13.0 | ← | ← | 14.0 | 13.0 |
| THICKNESS OF FIBER | FRONT FACE | 220 d/1 f | 1300 d/96 f | ← | ← | ← | ← |
| | BACK FACE | | 500 d/70 f | ← | ← | ← | ← |
| | PILE | 880 d/1 f | 600 d/1 f | ← | ← | 800 d/1 f | ← |
| TENSILE STRENGTH | LONGITUDINAL | 38.0 | 156.9 | 158.4 | 152.1 | 148.7 | 159.3 |
| (kg/5 cm) | LATERAL | 24.8 | 62.1 | 79.4 | 136.5 | 57.5 | 130.1 |
| ELONGATION (%) | LONGITUDINAL | 111.1 | 56.2 | 62.5 | 48.3 | 50.1 | 50.2 |
| | LATERAL | 189.3 | 66.4 | 68.2 | 43.3 | 78.0 | 40.0 |
| TEAR STRENGTH (kg) | LONGITUDINAL | 33.8 | 87.9 | 79.2 | 75.0 | 91.1 | 77.7 |
| | LATERAL | 26.2 | 49.2 | 44.9 | 63.7 | 41.1 | 66.7 |
| DISTORTION RATIO BY | LONGITUDINAL | — | 2.6 | ← | 2.7 | 1.4 | 1.2 |
| REPEATED LOADING | LATERAL | — | 10.6 | 2.7 | 5.6 | 4.6 | 0.2 |
| ABRASION RESISTANCE | LONGITUDINAL | — | 4.5 | ← | ← | ← | ← |
| | LATERAL | — | 4.0 | ← | 4.5 | ← | ← |
| MESH LAYER STRUCTURE | FRONT | MESH | HONEY COMB | ← | MESH | HONEY COMB | MESH |
| | BACK | MESH | FINE MESH | ← | FINE MESH | FINE MESH | FINE MESH |
| PILESTRUCTURE | | PARALLEL | CROSS | PARALLEL | CROSS | PARALLEL | CROSS |

In table 1, "d" indicates "denier" and "1 d" is a unit of thickness when one gram of a fiber material is pulled to 9,000 m. For example, "220 d" means that the fiber has a thickness obtained by pulling one gram of the fiber to 9,000/220=40.9 m. The letter "f" means "filament" which is a unit for expressing the number of monofilaments. For example, "70 f" means that one piece of thread is composed of 70 pieces of monofilaments. An expression "kg/5 cm" used for tensile strength is the strength required to pull a test piece of 5 cm width. An expression "parallel" used for the pile structure means a state that the piles 93 connecting the front mesh layer 91 and the back mesh layer 92 do not cross each other seen from a side, while "cross" means a state that the piles cross each other seen from a side.

As a manner of disposing the pile 93 (pile structure), it can be classified by a state of the piles 93 connecting between the front mesh layer 91 and the back mesh layer 92 seen from the side of the pile, more concretely, for instance, it can be classified into the following types shown in FIG. 9. FIG. 9A and FIG. 9B show a straight type in which the piles 93 are disposed to connect between respective fibers composing the front mesh layer 91 and respective opposing fibers composing the back mesh layer 92, in which FIG. 9A shows a straight type knitted in the shape of the letter "8", while FIG. 9B shows a type which is simply knitted straight. From FIG. 9C to FIG. 9E show cross types in which the piles 93 are knitted between respective adjacent threads for the front mesh layer 91 and respective adjacent threads for the back between the locking plates 82, 82 and the shafts 68, 69. Then, the seat back is pushed down forward. While the seat back is falling down forward, the linkage plates 60 and 61 linked to the back frame 30 also fall down forward. Accordingly, the shafts 68 and 69 inserted into the through-holes 60f and 61f provided below the linkage plate 60 and 61 move backward in a manner that they draw an arc along a lower orbit of tho linkage plates 60 and 61, in other words, along the arc-shaped long holes 22a and 22b of the base plate 20.

Simultaneously, the connection plates 50 and 51 connected to the back frame 30 pivot around the shaft members 54 and 55 disposed on the brackets 24 and 25 of the base plate 20 as if they fail forward. At this time, the connection plates 50 and 51 pivot with respect to the side frames 42 and 43 of the seat frame 40 by pivoting around the bushes 73 and 74 supporting the waist frame 70.

On the other hand, as for the linkage plates 60 and 61, the spaces between the lower portions of respective linkage plates and the connection plates are getting close from a state that the linkage plates and the connection plate form an inverted shape of the letter "V" when seen from the side. The guide shafts 66 and 67 linked to the linkage plates 60 and 61 also move backward along an orbit drawing an arc, and the guide shafts 66 and 67 are linked to the long holes 42a and 43a of the seat frame 40.

As a result, when the connection plates 50 and 51 are falling down forward while pivoting, the seat frame 40 approaches the base plate 20 while coming up forward. Since accompanied by coming up of the seat frame 40 forward, the guide shafts 66 and 67 move backward in the long holes 42a and 43a relatively, the back frame 30 approaches the seat frame 40. As described above, since the dimension of the back frame 30 is smaller than the seat frame 40, the back frame 30 abuts the seat cushion 920 supported by the seat frame 40 in the net members 90.

Furthermore, when the back frame 30 falls forward, the back frame 30 presses the seat cushion 920. At this time, the substantially cylindrical side edges 921 and 922 of the seat cushion 920 slide inward with respect to the side frames 42 and 43 so that the seat cushion 920 is depressed by being pressed with the back frame 30 and the back cushion 910. As a result, the back frame 30 is folded in a state to be surrounded by the seat frame 40.

Accordingly, the total thickness of the seal 10 in a folded state is not the thickness of the seat cushion composed of the seat frame 40 and the seat cushion 920 plus the thickness of the seat back composed of the back frame 30 and the back cushion 910, but the thickness can be within nearly the same thickness as the thickness of the seat cushion or the seat back alone.

When the seat changes its state from being folded as shown in FIG. 2 to being in use as shown in FIG. 1, reversely to the above, the seat back is raised backward. Then, each member moves completely in the reverse direction. When the shafts 68 and 69 inserted into the arc-shaped long holes 22a and 23a reach a front position in the arc-shaped long holes 22a and 23a, the shafts 68 and 69 push up the locking plate 82, and are linked and locked into the cut-out portions 82c and 82c of the locking plate 82 with the help of elastic force of the coil springs 83 and 83. Since respective shafts 68 and 69 abut on the stopper plates 86 and 86 in this state, the seat is supported stably in a state that the seat back is raised up as shown in FIG. 1.

As described above, according to the folding seat of the present invention, the distance between the inner sides of side framed composing the seat frame is arranged to be wider than the distance between the outer sides of side frames composing the back frame and the front end frame of the seat frame is positioned outside of the upper end frame of the back frame when the seat frame and the back frame come close upon folding the seat, and the back frame is surrounded by each side frame and the front end frame of the seat frame when the seat is folded so that the seat can be folded in a condition that the back frame is positioned inside these frames of the seat frame.

Accordingly, the total thickness of the seat in a folded state is not the thickness of the seat cushion plus the thickness of the seat back, but it can be within nearly the same thickness as the thickness of the seat cushion or the seat back alone, thereby increasing the space for baggage compared with the case using a conventional folding seat.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A folding seat comprising:
   a base plate having side plates and a upper face, said side plates being spaced from each other and arranged to face each other, each side plate having a long hole formed therein, said hole having a substantially arcuate shape;
   a pair of brackets extending from said upper face, said brackets arranged in spaced relationship to one another;
   a first connection plate and a second connection plate, said first connection plate is pivotably connected to one of said brackets and said second connection plate is pivotably connected to the other one of said pair of brackets;
   a back frame composed of an upper end frame and a pair of side frames extending from both ends of the upper end frame to support a cushioning member, a lower end of each side frame being connected to a respective one of said connection plates;
   linkage plates sandwiching each side frame of said back frame, each one of said linkage plates being disposed on an opposite side of each connection plate, and linked to each side frame;
   a shaft inserted into a lower end portion of said each linkage plate, said shaft adapted to link with each substantially, arcuate shaped long hole of said base plate;
   a seat frame comprising a front end frame and a pair of side frames extending longitudinally from both ends of the front end frame, said side frames define a long hole and a through-hole, said long hole is positioned toward a vicinity of a rear end of each of said side frames, and said through-hole is positioned between the long hole and the real end of each of said side frames;
   a shaft member inserted into the through-hole formed in each side frame of said seat frame, and fixed in such a manner that said connection plates are installed pivotably with respect to each side frame;
   a guide shaft inserted into the through-hole formed in each side frame of said seat frame, and linked to said linkage plate,
   wherein said seat frame and said back frame are structured and arranged such that a distance between each of the side frames composing said seat frame is wider than a distance between each of the side frames composing said back frame, and the front end frame of the seat frame is positioned outside the upper end frame of the back frame when the seat frame and the back frame come close together upon folding the seat; and
   wherein said guide shaft is positioned in front in each long hole formed in said seat frame and said shaft is positioned in front in each substantially are shaped long hole formed in said base plate when the seat is in use, and when the seat is folded, the back frame can be folded to be surrounded by said seat frame in such a manner that each connection plate pivots together with the back frame around each of the brackets, the shaft moves backward in each substantially arcuate shaped long hole, and the guide shaft also moves backward in each long hole.

2. The folding seat according to claim 1, wherein the cushioning member supported by said seat frame is adapted to sink when pressed by the back frame upon being folded.

3. The folding seat according to claim 2, wherein the cushioning member supported by said seat frame is made of a net member in a three-dimensional structure in which a front mesh layer and a back mesh layer are connected with a large number of piles.

4. The folding seat according to claim 1, wherein the cushioning member supported by said seat frame and the cushioning member supported by said back frame are made of a net member in a three-dimensional structure in which a front mesh layer and a back mesh layer are connected with a large number of piles, and have a one-piece structure united integrally with two cushioning members.

* * * * *